United States Patent [19]
Lee

[11] 3,789,854
[45] Feb. 5, 1974

[54] DUAL MODE CARDIAC PACER POWER SOURCE

[75] Inventor: Jin W. Lee, North Miami, Fla.

[73] Assignee: Medcor, Inc., Hollywood, Fla.

[22] Filed: Apr. 6, 1972

[21] Appl. No.: 241,577

[52] U.S. Cl. ............................. 128/419 P, 128/422
[51] Int. Cl. ............................................. A61n 1/36
[58] Field of Search .... 128/419 P, 419 R, 421, 422, 128/423

[56] References Cited
UNITED STATES PATENTS

| 3,528,428 | 9/1970 | Berkovits | 128/419 P |
| 3,620,220 | 11/1971 | Murphy, Jr. | 128/419 P |
| 3,635,224 | 1/1972 | Berkovits | 128/419 P |
| 3,707,974 | 1/1973 | Raddi | 128/419 P |

FOREIGN PATENTS OR APPLICATIONS

| 1,082,752 | 9/1967 | Great Britain | 128/419 P |
| 474,271 | 8/1969 | Switzerland | 128/419 P |

Primary Examiner—William E. Kamm

[57] ABSTRACT

A power source for a cardiac pacer operative in first and second states to provide respectively redundant battery power to said pacer and series connected battery power to said pacer. The alternative power source states permit accurate evaluation of battery conditions and provide altered cardiac pacer operating characteristics adapted to enable emergency operation for the relief of predetermined cardiac patient conditions.

15 Claims, 3 Drawing Figures

DUAL MODE CARDIAC PACER POWER SOURCE

FIELD OF THE INVENTION

This invention relates to cardiac pacer power sources and in particular to a battery power source alternately having redundant power output and increased voltage output states.

BACKGROUND OF THE INVENTION

Electronic cardiac pacers designed for body implantation of necessity must operate from a portable power source usually provided by one or more batteries. In the prior art these batteries have been normally selected for long life and high reliability such as provided by mercury-zinc cells. To provide further reliability prior art power sources have included redundant batteries and means for interconnecting them so that if one battery fails there is substantially no effect upon the other battery's ability to supply the necessary operating power for the pacer. U.S. Pat. No. 3,620,220 shows one example.

With the use of a redundant battery power source, an added margin of safety exists when both batteries are operating properly, but ceases to exist when one of the batteries in each pair has failed. It is therefore important in providing the advantages of a redundant power source to be able to determine accurately and reliably when one battery has failed and in which mode it has failed. In my prior U.S. Pat. application Ser. No. 78,659 filed Oct. 7, 1970, and entitled Cardiac-Autopacer, I disclosed a system for utilizing the small change in supply output voltage occurring when batteries in a redundant source begin to fail by altering the cardiac pacer pulse rate so as to provide an indication of battery depletion. When this condition is detected the patient can arrange for the relatively simple operation to replace the powering batteries of his pacer.

BRIEF SUMMARY OF THE INVENTION

In accordance with a preferred embodiment of the present invention an electronic cardiac pacer power source is provided having first and second externally controlled states. In the first state, the pacer power source provides redundant battery power to the pacer through isolation devices which prevent a failure in one redundant battery to effect operation in the other redundant battery. In the second state, the pacer batteries are connected in series to double the voltage output of the source in the case where all batteries are properly operating or to provide substantially different voltage outputs depending upon the condition of a failed battery.

In normal conditions, when all batteries are properly operating, the externally controlled power source permits emergency artificial heart stimulation at elevated pulse rates and pulse amplitudes to counteract conditions of premature ventricular contraction; a temporary increase in the patient's threshold for artificial stimulation such as by dislocation of the ventricular electrode. The emergency operation can be readily effected even by the patient himself to provide emergency pacing without the need for an attending physician or hospital facilities until the patient can be safely brought to where appropriate medical attention is available.

BRIEF DESCRIPTION OF THE DRAWINGS

These and other features of the invention will be more fully understood by reference to the following detailed description of a preferred embodiment presented for purposes of illustration, and not by way of limitation, and to the accompanying drawings of which.

DETAILED DESCRIPTION OF THE PREFERRED EMBODIMENT

Figure 1:
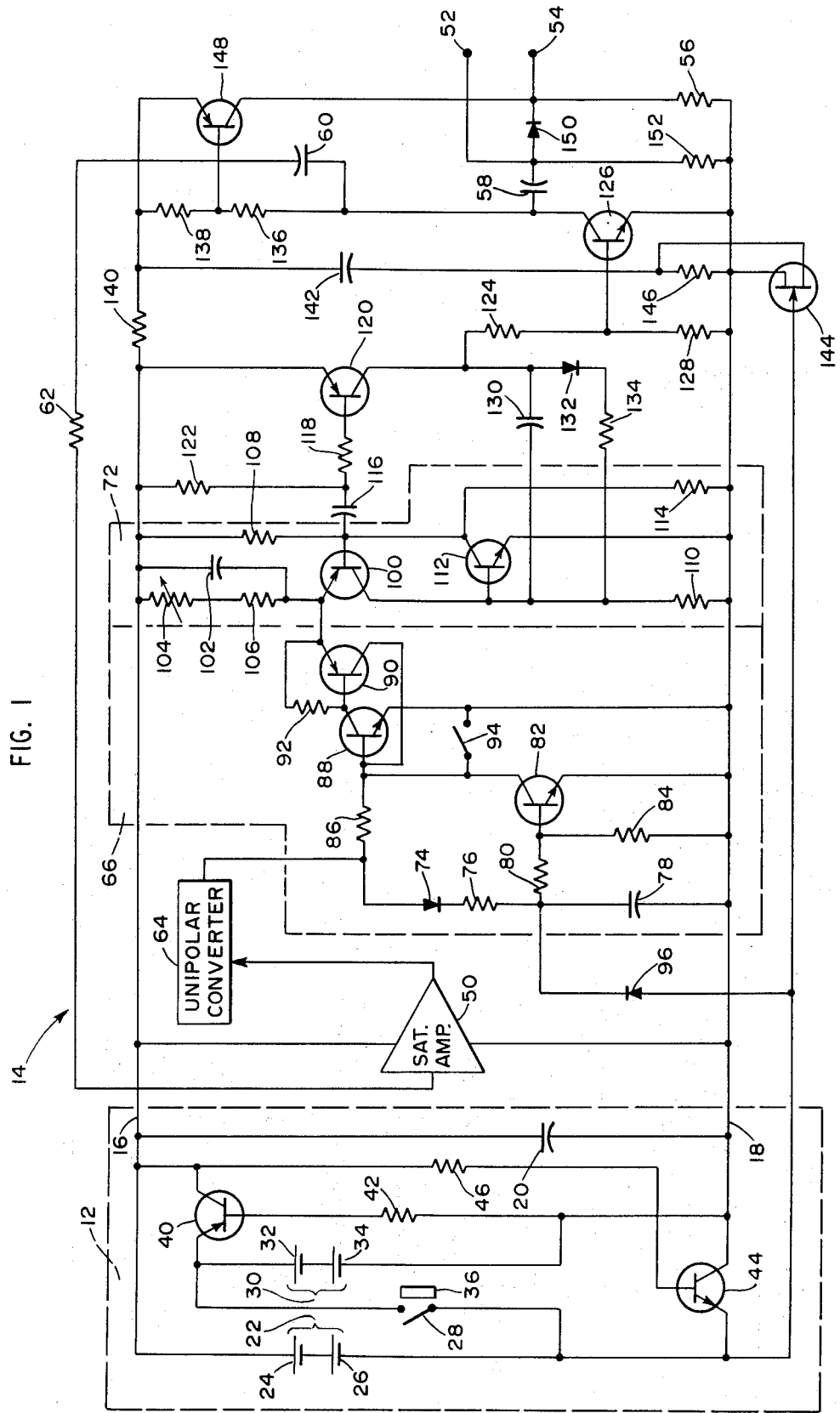
FIG. 1 is a partial block and partial schematic diagram of a cardiac pacer power supply and electronic pacer for use therewith according to the invention.

Referring now to FIG. 1, there is shown in partial block and partial schematic diagram a cardiac pacer according to the invention having a power supply 12 for providing electrical excitation to the electronic cardiac pacer 14. Referring to the power source 12, first and second terminals 16 and 18 are provided from which the power is taken to energize the pacer 14. The terminals 16 and 18 have connected thereacross a filtering capacitor 20. A first battery 22 is composed of cells 24 and 26 and has the anode thereof connected to the terminal 16. The cathode of battery 22 is connected through a normally open magnetic reed switch 28 to the anode of a second battery 30 composed of cells 32 and 34. The cathode of battery 30 is connected to the terminal 18.

The reed switch 28 is operable in response to an externally applied magnetic field, such as for example from a magnet 36, to close its contacts and connect the cathode of battery 22 to the anode of battery 30. The switch 28 may be either bistable or monostable such that the magnet 36 is effective to switch it between two bistable states according to how the magnet is applied or to hold the contacts of switch 28 closed only if the magnet 36 is held adjacent thereto.

As can be seen, when switch 28 is closed the batteries 22 and 30 will be connected in series across the terminals 16 and 18 to provide a voltage between those terminals equal to four times the normal voltage of each cell. This voltage is normally at least twice the level necessary to cause artificial cardiac stimulation and thus in the normal course, when the contacts of the switch 28 are opened, the batteries 22 and 30 are provided as redundant power sources connected in parallel across the terminals 16 and 18. To accomplish this function a first, PNP, transistor 40 is provided with its collector connected to the terminal 16 and its emitter connected to the junction of the switch 28 and battery 30. The base of transistor 40 is biased through a resistor 42 from the cathode of the battery 30 which is also connected to the terminal 18. A second transistor 44 of the NPN type has its collector connected to the terminal 18 and its emitter connected to the junction between switch 28 and battery 22. The base of transistor 44 is biased through a resistor 46 from the abode of the battery 22 which is also connected to terminal 16.

The values of the resistors 42 and 44 are adjusted so that when the contacts of switch 28 are open the base-emitter junctions of the two transistors 40 and 44 are forward biased to provide conduction therethrough of current from the respective batteries 30 and 22 with a small voltage drop produced in the transistors. If any of the batteries or the battery circuit develop an open circuit condition, the transistor which is used to supply current from that battery to the pacer 14 will no longer be forward biased in its base-emitter junction and unable to conduct current thus isolating that battery from the other battery in the power supply 12. If instead, one of the cells becomes short circuited or depleted in energy such that the battery as a whole exhibits a lower voltage output, the emitter-collector terminals of the transistor used to supply current from that battery will be reverse biased by the voltage conditions existing in the circuit and again that defective battery will be isolated in the circuit. When the contacts of switch 28 are closed, connecting the four cells of the two batteries 22 and 30 in series across the terminals 16 and 18, the emitter-collector junctions of both transistors will become reverse biased preventing the flow of current through the two transistors which would otherwise provide a short circuit through the switch 28.

Utilizing this design, it is possible to provide for a redundant battery power source for the electronic pacer wherein each of two batteries independently provides current to the pacer and is immediately isolated from the circuit if it should fail in either an open or short circuit condition. Additionally, both batteries may be placed in series across the terminals for supplying power to the electronic cardiac pacer which, as will be explained below, increases the output voltage of the artificial pulses provided by the pacer. The series connection provides emergency operation where the normal voltage level provided by the pacer is insufficient to stimulate the heart or if one cell in each battery should fail. Moreover, where one or more batteries has failed, the series connection serves to identify where failure has occurred and permit a re-evaluation of remaining battery energy and thus life.

Figure 2:
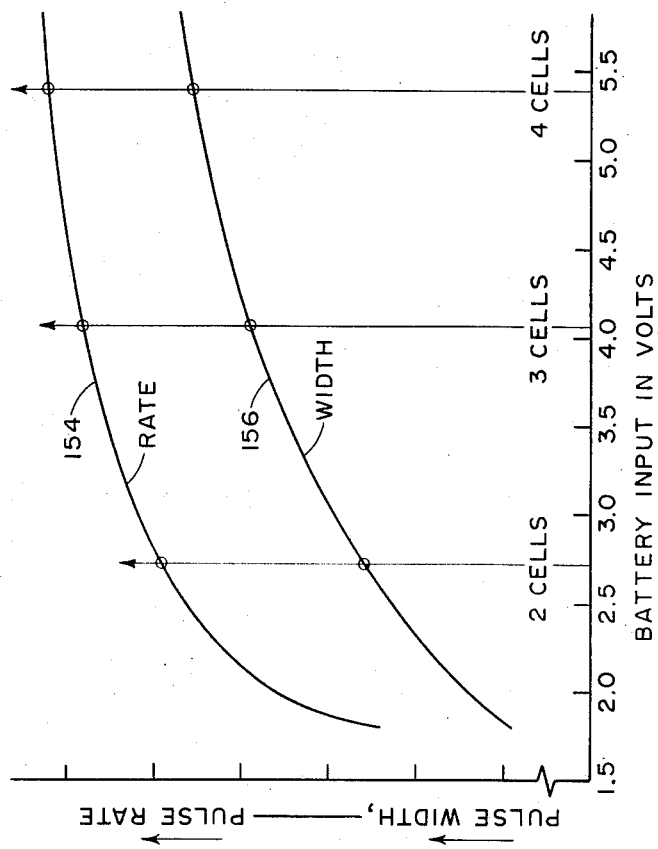
FIG. 2 is a schematic diagram of a modification.

Further advantage may be obtained from the use of diodes 24a, 26a, 32a and 34a shown in FIG. 2 connected respectively across batteries 24, 26, 32 and 34. These diodes are reverse biased when each battery is normally charged, but permit current by-passing of a failed battery when it has failed in an open circuited condition. Moreover, the diode connection prevents battery reverse polarization as has been known to occur in damaged batteries.

To understand further the functioning of these features reference will be made to the electronics contained within the cardiac pacer 14, these being similar to those shown in my copending United States patent application Ser. No. 78,659, filed Oct. 7, 1970 for CARDIAC-AUTOPACER.

Within the pacer 14 an amplifier 50 receives as its input a signal from electrodes 52 and 54 connected to body and heart tissue at points known in the art to receive body signals representative of ventricular contractions within the heart. A resistance 56 connects electrode 54 to circuit ground provided at terminal 18, and capacitors 58 and 60 and series resistor 62 connect electrode 52 into the amplifier 50. Amplifier 50 is preferably of a saturating design indicated in my above-referenced United States patent application as amplifier 26 in FIG. 2. The output of the amplifier 50 is provided to a regenerative unipolar converter 64 also of design similar to that indicated in my above-referenced United States patent application as element 32. The converter 64 responds to transitions or pulses from the amplifier 50 to convert them into single polarity impulses, the ventricular contraction signals applied to the amplifier 50 being known to occur unpredictably in either polarity. The output of the converter 64 is applied to a stabilized reset trigger 66 whose function is to inhibit the pulses from the converter 64 to a pulse generator 72 until a predetermined, refractory interval has elapsed since the last output from the converter 64.

Within the reset trigger 66, the output of converter 64 is conducted through a diode 74, resistor 76, and capacitor 78 to terminal 18. From the junction between resistor 76 and capacitor 78, a resistor 80 leads to the base of a grounded emitter NPN transistor 82 and thence through a resistor 84 to ground terminal 18. The output of the unipolar converter 64 is also supplied through a resistor 86 to the base of a grounded emitter NPN transistor 88 and collector of transistor 82. The collector of transistor 88 is applied to the base of PNP transistor 90. The collector and emitter of transistor 90 are respectively applied to the base of transistor 88 and, through a resistor 92, to the collector of transistor 88. The collector of transistor 90 provides the output for reset trigger 66. An optional reed switch 94 is provided for external activation by a magnet to connect together the base and emitter of transistor 88 and inhibit reset of the pulse generator. Also optionally, a diode 96 is connected for conductions from the junction of battery 22, switch 28 and transistor 44 to the junction of resistors 76 and 80 and capacitor 78.

In operation, each pulse produced at the output of converter 64 is effective to trigger transistor 82 into conduction, capacitor 78 holding transistor 82 in conduction for a predetermined refractory interval. While transistor 82 conducts, transistor 88 is inhibited from conducting and generating a reset of pulse generator 72. Switch 94 in a closed condition produces a similar inhibition. When transistor 82 is not conducting, pulses from converter 64 trigger transistor 88 and transistor 90 to cause resetting of generator 72. Regenerative feedback between transistors 88 and 90 causes a latching action similar to the pulse generation of transistors within generator 72 and produces reset effects that are similar to those from pulse generator 72 and induce an equal interval for timing to the next pulse from the reset or pulse generation in generator 72.

When switch 28 is closed, an elevated voltage is applied through diode 96 to turn on transistor 82, inhibit reset of generator 72 and produce continuous pulse generation thereby.

The output of the circuit 66 is applied in pulse generator circuit 72 into the emitter of a PNP transistor 100. The emitter of transistor 100 is also connected to terminal 16 through a capacitor 102 functioning as the pulse interval timing capacitor and also through series fixed and variable resistors 104 and 106 respectively. The base of transistor 100 is connected to terminal 16 through a resistor 108 while its collector is connected to terminal 18 through a resistor 110. The base of transistor 100 is also connected to the collector of an NPN transistor 112. Transistor 112 has its emitter connected to terminal 18 and its base connected to the collector of transistor 100. A further resistor 114 is connected between the collector of transistor 112 and terminal 18. The pulse generator 72 is a regenerative circuit using the discharge and charge time constants of the capacitor 102 to provide pulse width and pulse interval timing as indicated in my referenced United States patent application.

The signal at the base of transistor 100 is applied through a capacitor 116 and resistor 118 into the base of a PNP transistor 120, the base thereof being biased through a resistor 122 to terminal 16 and its emitter being connected directly to the terminal 16. The collector of transistor 120 is connected through a resistance 124 to the base of grounded emitter NPN transistor 126 and through a series resistor 128, to ground terminal 18. The collector of transistor 120 also provides a feedback signal through a capacitor 130 in parallel with a series combination of a diode 132 and resistor 134 to the base of transistor 112.

The collector of transistor 126 applies the artificial stimulating pulse through capacitor 58, acting as a voltage doubling capacitor, to the electrode 52. That collector is also connected through series resistances 136 and 138 from a voltage dropping resistor 140 connected to terminal 16. Connecting the low side of resistor 140 to terminal 18 is a storage capacitor 142 in series with a parallel combination of an FET transistor 144 and resistor 146. The low side of resistor 140 is also connected through the emitter-collector junction of a PNP transistor 148 to the electrode 54. The base of transistor 148 is biased from the junction of resistors 136 and 138. A diode 150 protects against reverse polarization across electrodes 52 and 54 and balancing resistor 152 connects electrode 52 to terminal 18.

Figure 3:
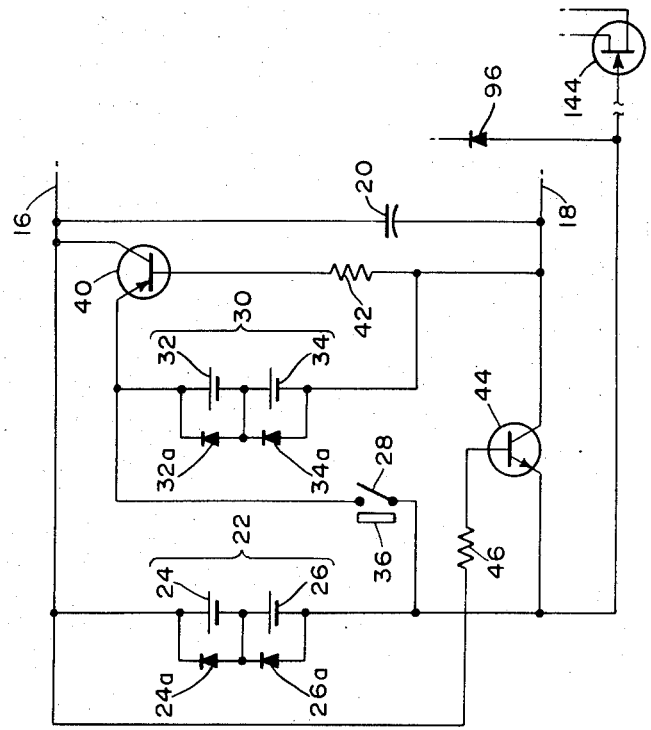
FIG. 3 is a chart showing how the selectively different battery conditions of the power source affect pacer operation.

As indicated in my above-identified United States patent application, the pulse generated and appearing at the base of transistor 100 is applied through transistor 120 for width determination by capacitor 116 and resistors 118 and 122 and for application to the voltage doubling circuit employing transistors 126 and 148. It also is applied in a regulating feedback configuration through capacitor 130, diode 132 and resistor 134 to the base of transistor 112 to regulate the pulse width and interval independent of load on the electrodes 52 and 54. The transistors 126 and 148 operate in response to a pulse from the collector of transistor 120 to connect capacitor 58 in series with the voltage across terminals 16 and 18 to the electrodes 52 and 54. When that voltage between the terminals 16 and 18 is the normal voltage resulting from the parallel redundant configuration with the switch 28 in an open condition a normal pulse amplitude and interval will be achieved. However, when the switch 28 is closed, doubling the voltage at the terminals 16 and 18, the design of the pulse generating circuit 72 produces a sufficient voltage dependency in its pulse rate to greatly increase the rate, according to curve 154 in FIG. 3. As indicated in my above-referenced application, this voltage dependency is produced by a cooperation between the reference level established by resistors 108 and 114 and the forward voltage turn-on of the transistor 100. The pulse width is also voltage dependent, and it varies according to the curve 156 indicated in FIG. 3 as well.

As can be appreciated by those skilled in the art, when the contacts of switch 28 are closed and the batteries are connected in series across the terminals 16 and 18, not only will the pulse output of the pacer have a substantially higher voltage amplitude, but also energy will be depleted from the batteries 22 and 30 at a higher rate. Accordingly, the gate for the FET transistor 144 is connected at the negative terminal of the battery 22 so as to provide a substantial short circuit through the FET 144 when the switch 28 is in the open condition but to open circuit the transistor 144 when the switch 28 is in the closed position. The resistor 146 which is placed in series with the storage capacitor 142 when the FET 144 is open circuited reduces the energy supplied by the pulse output and therefore significantly enhances battery life under the conditions of increased voltage stimulation.

The switch 28 can also be activated to apply the batteries in series across the terminals 16 and 18 in the event that it is wished to detect the condition of the batteries or the individual cells therein. This is to be normally accomplished by use of the magnet 36 to close the contacts of switch 28. The contacts of the switch 94 may also then be closed so that the pacer is operated in the continuous mode whereby artificial impulses are generated at a repetitive rate reflecting the voltage across the terminals 16 and 18. If diode 96 is employed, this action is automatic. By detecting the pulse width and pulse rate by electrocardiogram means and cathode ray tube means, it is possible to determine the general condition of the four cells in the batteries 22 and 30 in conjunction with the curves of FIG. 3. In particular, Table I below indicates exemplary observed pulse rates and the possible battery conditions that can result therefrom with and without the diodes 24a-34a. It is also possible to adjust the capacitor 102 discharge created by reset circuit 66 to duplicate the discharge by generator 72 so that in the demand mode the interval between a natural or artificial beat and the next artificial beat can be used to determine all conditions. Thus, in demand operation an isolated artificial pulse is sufficient to reveal battery condition.

TABLE I

| | BATTERIES | | |
| --- | --- | --- | --- |
| Failure MODE | Parallel Rate | Series Rate with Diodes | Series Rate without Diodes |
| 1 cell open | 69 | <78 | 0 |
| 1 cell shorted | 69 | 78 | 78 |
| 2 cells open in same battery | 69 | <69 | 0 |
| 2 cells open in different batteries | 0 | <69 | 0 |
| 2 cells shorted in same battery | 69 | 69 | 69 |
| 2 cells shorted in different batteries | 0 | 69 | 69 |
| No cell failure | 69 | 82 | 82 |

These exemplary conditions of the several ways in which battery failure can occur provide an indication of how rate and width information can be used to gain insight into the condition of the battery. It is to be noted that a different set of rates results from all six types of failure, but that pacer operation can be maintained in all failures modes for up to 50 percent of the batteries. As a result it is possible to evaluate the criticality of the battery failure and repredict when the batteries should be replaced.

In a further feature of the power source according to the invention and when no or only one battery failure has occurred, it might be desirable to activate switch 28 to close its contacts and cause the conditions indicated in the first two or last lines of Table I with an increased pulse rate, and an increased stimulating pulse amplitude as well as width. The increased rate is useful to prevent premature ventricular contraction while the increased amplitude and pulse width are useful where a substantial increase in threshold to artificial pulsing has occurred requiring a higher voltage pulse in order to cause artificial ventricular contraction. This increase in threshold might occur from a dislodging of the electrode 52 which is normally lodged in the right ventricle.

Having described above a preferred embodiment according to the invention, it will occur to those skilled in the art that various modifications and alternatives can be generated without departing from the spirit of the invention. It is accordingly intended to limit the scope of the invention only as indicated in the following claims.

What is claimed is:

1. In a cardiac pacer, a redundant power supply operative to provide first and second states of voltage output and comprising:
   power output terminals;
   first and second electrical power sources;
   selectively actuable means having first and second states and providing serial connection of said first and second sources to said power output terminals in said first state;
   means for providing parallel redundant connection of said sources to said power output terminals when said selectively actuable means is in said second state.

2. The cardiac pacer redundant power supply of claim 1 further having means responsive to said second state for isolating one of said sources if that source is in a failed condition.

3. The cardiac pacer redundant power supply of claim 1 further including means for by-passing open circuits in failed sources thereby to provide an operative series connection in said first state despite open circuit failure of said first or second source.

4. A cardiac pacer having the redundant power supply of claim 1 and including:
   demand cardiac stimulation pulse providing means receiving power from said output terminals; and
   means responsive to said first state of said selectively actuable means for causing said pulse providing means to operate in a continuous mode.

5. A cardiac pacer having the redundant power supply of claim 1 and including:
   means receiving operating power from said output terminals for providing demand generation of artificial cardiac pulses with an interval between pulses and further having first means to reinitiate the interval between artificial pulses after each artificial pulse and second means to reinitiate the interval to the next artificial pulse in response to natural heartbeats;
   said first and second means including means operative to reinitiate substantially equal intervals whereby power supply conditions can be monitored in said first state in the demand mode of said providing means whenever an artificial pulse is generated.

6. A cardiac pacer having the redundant power supply of claim 1 and including:
   means receiving operating power from said output terminals for providing demand generation of cardiac pulses with pulse timing representative of voltage applied to said terminals; and
   externally actuable means for causing said pulse providing means to operate in a continuous mode.

7. A cardiac pacer having the redundant power supply of claim 1 and further including:
   means receiving operating power from said output terminals for generating cardiac pulses; and
   means responsive to said first state of said selectively actuable means for diminishing the energy supplied by pulses of said pulse generating means thereby to reduce the increase in power consumption from said power supply in an elevated voltage output condition resulting from said first state.

8. A cardiac pacer having the redundant power supply of claim 1 and including:
   pulse generating means receiving operating power from said output terminals and responsive in pulse timing to the voltage of said power supply; and
   means for regulating said pulse timing against load variations.

9. The cardiac pacer redundant power supply of claim 1 further including means for providing different combinations of power supply voltage outputs in said first and second states corresponding to predetermined normal and failed conditions of said first and second sources.

10. A redundant power supply for cardiac pacer electronics operative to provide first and second output characteristics and comprising:
    first and second electrical sources;
    current switching means selectively operative to open or close a circuit;
    first and second terminals for connecting said power supply to said pacer electronics;
    means for interconnecting said first and second sources and said switch to provide a series connection of said first and second sources to said terminals in response to said switching means being in a closed circuit state;
    first and second controllable semiconductor switches;
    means for providing a bias current to said first switch from at least one of said sources;
    means for providing a bias current to said second switch from at least one of said sources;
    means for connecting said first source to said terminals for supplying operating current to said pacer electronics through said first semiconductor switch in response to said switching means being in an open circuit condition;
    means operative in association with said first and second semiconductor switches to inhibit conduction thereof in response to said switching means being in said closed circuit condition.

11. A redundant power supply for cardiac pacer electronics operative to provide first and second output characteristics and comprising:
    first and second sets of batteries;
    a selectively actuable switch for providing open and closed circuit conditions;
    first and second terminals for providing operating power;
    means for interconnecting said switch and said first and second sets of batteries to serially connect said batteries to said terminals in response to said switch being in said closed circuit condition;
    first and second transistors, each having an emitter-base junction and an emitter-collector junction;
    means for biasing the emitter-base junction of said first transistor with current from said first battery set;

means for connecting opposite terminals of said first battery set respectively directly to said second terminal and to said first terminal through the emitter-collector circuit of said first transistor;

means for biasing the emitter-base junction of said second transistor with current from said second battery set;

means for connecting opposite terminals of second battery set respectively directly to said first terminal and to said second terminal through the emitter-collector circuit of said second transistor;

said first and second transistors thereby blocking emitter-collector conduction in response to said switch being in said closed circuit condition and enabling emitter-collector conduction in response to said switch being in an open condition and further in response to said first and second batteries being of substantially equivalent voltage output.

12. The cardiac pacer redundant power supply of claim 11 further including a diode connected across each battery in said battery sets to provide conduction by-passing a battery in the event of open circuit failure thereof and to provide a shunt for reverse polarization of a battery.

13. A cardiac pacer having the redundant power supply of claim 11 and further including:

means receiving operating power from said terminals for generating an artificial heart stimulating pulse; and means for reducing the energy in said pulse in response to said switch being in said closed circuit condition.

14. A cardiac pacer having the redundant power source of claim 11 and further including:

means receiving operating power from said terminals for generating artificial heart stimulating pulses with an interval between pulses and pulse width which varies in response to the voltage applied to said terminals of said pacer electronics;

the timing of artificial pulses generated by said pulse generating means thereby providing an indication of the voltage supplied to said pacer electronics when said switch is in said open and closed conditions thereby to indicate the conditions of said first and second battery sets.

15. The cardiac pacer of claim 14 further including:

means for providing demand operation of said generating means; and means actuable in said first state to provide an inhibition of said demand operation providing means thereby to cause said pulse generating means to provide continuously generated pulses at a rate reflecting the voltage supplied to the terminals of said pacer electronics.

* * * * *